United States Patent Office 3,046,152
Patented July 24, 1962

3,046,152
METHOD OF PREPARING COLLOIDAL CALCIUM MAGNESIUM SILICATE
Tsuneyoshi Shiraishi, 50, 4-Chome, Motohama-cho, Amagasaki, Japan
No Drawing. Filed Nov. 25, 1958, Ser. No. 776,168
1 Claim. (Cl. 106—306)

The present invention relates to a method of preparing colloidal calcium magnesium silicate and has for its object to provide colloidal calcium magnesium silicate in the form of powder especially suitable for a filler to be used with rubber, vinyl resin and other synthetic resins, for a filler for paper, and for other uses from such raw materials as occur abundantly in nature and thus are easily obtainable.

According to the present invention, there is provided a method of preparing colloidal calcium magnesium silicate which comprises adding a suspension of calcium and magnesium hydroxides and also sodium sulfide to material containing a large amount of alkaline soluble silica such as pumice, diatomaceous earth, montmorillonite and natural glass or material containing a large amount of hydrated aluminium silicate such as kaolinite and hydrated halloysite and heating the mixture under pressure in the presence of water.

Some silicates have previously been utilized in the form of powder in rubber, paint, paper and other industries and have some characteristic features not found in ordinary extenders. However, due to the complexity of the process of preparing these products, they are extremely expensive as compared with other inorganic filling materials and thus are low in practical value.

In the past, a large number of proposals have been made in patent literature and research papers with respect to hydrothermal reaction between silicates and alkalies. However, the required products have only been obtained by a reaction employing very high temperature and pressure or by a reaction continued for an extremely long period of time employing normal temperature and pressure. In these cases, if the hydrothermal reaction is incomplete, the silicate obtained may solidify when dried or be reduced to hydraulic silicate powder due to the remaining free alkali, thus making it difficult to obtain a finished product of satisfactory quality.

The present invention has been attained after various investigations made for the purpose of obviating such deficiencies involved in the previous processes and is mainly intended to supply powdered materials for industrial uses at low most. According to the present invention, silicates or clays containing a large amount of alkaline soluble silica or hydrated aluminum silicate and occurring abundantly in nature are used as raw material, and a suspension comprising calcium and magnesium hydroxides is added to such raw material. Further to this mixture is added sodium sulfide as a reaction accelerator. The mixture is then subjected to hydrothermal reaction under pressure to produce colloidal calcium magnesium silicate or other colloidal alkali earth silicate. In other words, according to the present invention, a suspension of coexisting calcium and magnesium hydroxides, such as a suspension obtained by slaking calcined dolomite, is added to a material containing a large amount of alkali soluble silicates such as pumice, diatomaceous earth, montmorillonite, or natural glass or a material containing a large amount of hydrated aluminum silicate such as kaolinite or hydrated halloysite and further to the mixture is added sodium sulfide as a reaction accelerator. The mixture is then subjected to pressure hydrothermal reaction in the presence of water.

Also, in accordance with the present invention, a surface active agent such as sodium salt of high molecular alcohol is advantageously added in an amount of approximately 0.5 to 2.0 weight percent of the total material prior to the hydrothermal reaction so that the reaction may proceed uniformly and smoothly. The powdered product thus obtained shows a good dispersity when mixed or kneaded with rubber, vinyl resin or other synthetic resin, and thus is effective to improve physical properties of rubber, vinyl resin or other synthetic resin products so that the addition of surface active agents as described above is highly desirable.

Thus, in accordance with the present invention, since sodium sulfide is employed with a suspension of mixed calcium and magnesium hydroxides which are moderate in action as an alkaline agent, high dissolving power can be obtained for silicate clays consequently reducing the time of reaction as compared with cases where other strong alkaline agents are used. In addition, even if some sodium sulfide should remain in a free state after the reaction, it would be oxidized by air to form sodium thiosulfate, which is easy to remove by washing, so that there is no possibility that it may remain in the product to cause solidification thereof.

If the amount of sodium sulfide added be too small, that is, less than 0.5 weight percent of the total material, its reaction accelerating effect would be weak so as to cause solidification during the drying process following the hydrothermal reaction. On the other hand, if the amount be over 3 percent, some of calcium and magnesium hydroxides would remain in a free state making it necessary to remove such free hydroxides after the reaction by repeated rinsing, which makes such process impracticable. Thus, it will be recognized that sodium sulfide should preferably be added in an amount of 0.5 to 3 weight percent of the total material.

According to the present invention, as described above, a material containing a large amount of alkaline soluble silicate or hydrated aluminum silicate is used with calcium and magnesium hydroxides and, as a reaction accelerator, sodium sulfide added to the material, the mixture being subjected to hydrothermal reaction under a working pressure of 4 to 45 kg./cm.$^2$ in an autoclave which may withstand pressures up to some 50 kg./cm.$^2$. It is to be noted that such reaction produces complexed calcium and magnesium silicate instead of mere calcium silicate and that the reaction is accelerated by the addition of sodium sulfide as described above. The dispersity of the powdered product may be increased by the addition of a proper surface active agent such as sodium salt of high molecular alcohol in an amount of 0.5 to 2.0 percent. It will be recognized that the product prepared by the method of the present invention is very suitable for fillers for rubber and resins. Further, the use of sodium sulfide provides for the preparation of powder material having a very excellent quality as compared with that of the product which is obtained without employing sodium sulfide otherwise under substantially the same conditions. It will be appreciated that this, together with the reaction accelerating effect of the sodium sulfide, greatly increases the usefulness of the present invention.

Various test results show that the use of sodium sulfide in accordance with the present invention has an effect of accelerating the hydrothermal reaction and that the dried finished product has a softness such that the product may easily be crushed with the finger tip and also small particle sizes as well as a large apparent volume. The fact that the addition of sodium sulfide is effective to accelerate the reaction will be apparent from the test described below.

With Sample A comprising 130 grams of diatomaceous earth having 110 grams of aqueous suspension of calcined dolomite added, and Sample B having additionally 12 grams of sodium sulfide, a number of specimens were taken at definite time intervals during the pressure hydrothermal reaction under the same conditions, and were analyzed with a Geiger counter recording X-ray diffractometer to determine the intensity of the 2.62 A. line, which is the strong line for calcium hydroxide. The result of such test is as disclosed in the following table:

INTENSITY OF 2.62 A. LINE

| Time, Minutes | Sample A | Sample B |
|---|---|---|
| 0 | 10.0 | 10.0 |
| 10 | 8.6 | 8.0 |
| 20 | 7.5 | 6.7 |
| 30 | 6.8 | 4.2 |
| 60 | 5.5 | 1.5 |
| 90 | 4.4 | — |
| 120 | 3.6 | — |
| 180 | 2.3 | — |
| 360 | 0.6 | — |

As will be recognized, the intensity of the 2.62 A. line can be utilized as an indication of the state of progress of the hydrothermal reaction. To compare such progresses with Samples A and B, the strong line (2.62 A.) for calcium hydroxide could not be observed with Sample B after the lapse of some seventy minutes, while, with Sample A, calcium hydroxide was observed to exist even after the reaction had continued for six hours. This indicates clearly that the velocity of the hydrothermal reaction is extremely slow when a hydrated suspension of calcined dolomite is used alone while, when the suspension is used together with sodium sulfide, such velocity is substantially accelerated thereby to produce characteristic silicate powder.

Some practical examples of carrying out the method of the present invention will now be described.

Example 1

130 grams of diatomaceous earth was uniformly mixed with 110 grams of calcined dolomite and 2,000 grams of water to produce a viscous suspension, to which was then added 12 grams of sodium sulfide. Subsequently, the mixture was placed in an autoclave having a capacity of 3,000 cc., heated to 150° C. and subjected to reaction under a pressure of 4.2 kg./cm.$^2$ for 90 minutes to form a semi-dried material, which was removed out of the autoclave, dried and crushed to form fine, pure white, flake bulky powder of particle sizes of 0.05 to 0.50 micron.

Example 2

130 grams of montmorillonite, 110 grams of calcined dolomite, 2,500 grams of water and 12 grams of sodium sulfide were uniformly agitated and mixed 24 grams of the sodium salt of high molecular alcohol was added to the mixture, which was then agitated with air to form a viscous suspension. Such suspension was heated to 250° C. in an autoclave of 3,000 cc. capacity, subjected to reaction under pressure of 42.2 kg./cm.$^2$ for 30 minutes, then dried and crushed to form white flaky powder of particle sizes of 0.05 to 0.50 micron.

The comparison of the test results with rubber compound employing the powder obtained in the above examples with that obtained when commercially available calcium silicate (high grade one) was used is disclosed in the following table. As will be seen, the product prepared by the method of the present invention imparts to such compound remarkably improved physical properties.

PROPERTIES OF COMPOUND RUBBER
[At room temperature of 22.5° C.]

| Specimen material | Time of cures (40 lbs. stream), minutes | Modulus 300%, kg./cm.$^2$ | Tensile strength, kg./cm.$^2$ | Elongation, percent | Hardness (JIS) | Abrasion loss, percent | Flex resistance, $10^3$ times | Permanent set, percent |
|---|---|---|---|---|---|---|---|---|
| With product by Example 1 | 20 | 90.2 | 183 | 480 | 74 | 2.8 | 60 | 4.5 |
| With product by Example 2 | 20 | 85.7 | 196 | 520 | 72 | 3.0 | 65 | 4.0 |
| With commercial calcium silicate | 20 | 77.0 | 158 | 550 | 68 | 5.5 | 20 | 5.2 |

An example of compounding ratio follows.

*Recipes (weight parts)*

| | |
|---|---|
| SRB (Cold) | 100.0 |
| Zinc oxide | 5.0 |
| Stearic acid | 1.0 |
| Sulfur | 2.0 |
| Accelerator DM | 1.5 |
| Accelerator D | 0.5 |
| Specimen material | 60.0 |
| Diethylene glycol | 3.5 |

Also, the use of the product obtained in Example 1 as a filling material for high class tissue paper imparted an excellent opacity thereto compared with that when commercially available calcium silicate was used. An example of the test results is given below which shows clearly that the product prepared by the present invention is quite excellent.

PAPER COMPOSED OF 50% B–SP AND 50% B–KP, 10% MATERIAL COMPOUNDED TO PULP

| Specimen: | Opacity, percent |
|---|---|
| Added with product by Example 1 | 80.1 |
| Added with commercial calcium silicate | 76.2 |
| None added | 67.7 |

What I claim is:

A method of preparing colloidal calcium magnesium silicate which comprises heating a mixture under pressure of 4 to 45 kg./cm.$^2$ at a temperature of 150° C. to 250° C. for 30 to 90 minutes consisting essentially of 130 parts by weight of a material selected from the group consisting of diatomaceous earth and montmorillonite, 12 parts by weight of sodium sulfide and an aqueous viscous suspension of hydroxides formed by slaking 110 parts by weight of calcined dolomite with 2,000 to 2,500 parts by weight of water.

References Cited in the file of this patent

UNITED STATES PATENTS

| 1,918,361 | Wilberg et al. | July 18, 1933 |
| 1,945,534 | Rembert | Feb. 6, 1934 |
| 2,224,520 | Meincke | Dec. 10, 1940 |
| 2,257,544 | Clarke | Sept. 30, 1941 |
| 2,287,700 | Muskat et al. | June 23, 1942 |
| 2,742,345 | Kloepfer et al. | Apr. 17, 1956 |
| 2,888,377 | Allen | May 26, 1959 |

FOREIGN PATENTS

| 22,432 1896 | Great Britain | Dec. 12, 1896 |